United States Patent
Matsuda et al.

(10) Patent No.: US 6,892,716 B2
(45) Date of Patent: May 17, 2005

(54) OIL SEPARATOR FOR ENGINE, AND PERSONAL WATERCRAFT

(75) Inventors: Yoshimoto Matsuda, Kobe (JP); Yasuo Okada, Akashi (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/645,477

(22) Filed: Aug. 20, 2003

(65) Prior Publication Data

US 2004/0069287 A1 Apr. 15, 2004

(30) Foreign Application Priority Data

Aug. 23, 2002 (JP) ........................................ 2002-242997
Oct. 29, 2002 (JP) ........................................ 2002-314352

(51) Int. Cl.$^7$ ............................................. B63H 11/00
(52) U.S. Cl. ..................................................... 123/572
(58) Field of Search ................................. 123/572–574

(56) References Cited

U.S. PATENT DOCUMENTS

| | | | | |
|---|---|---|---|---|
| 4,269,607 A | * | 5/1981 | Walker ........................ | 95/271 |
| 5,450,835 A | * | 9/1995 | Wagner ....................... | 123/573 |
| 5,951,344 A | * | 9/1999 | Tsunoda et al. ............. | 123/572 |
| 6,152,119 A | * | 11/2000 | Hoshiba et al. ............. | 123/572 |
| 6,190,221 B1 | * | 2/2001 | Nanami .................... | 440/88 R |
| 6,408,835 B1 | * | 6/2002 | Katayama et al. .......... | 123/572 |
| 6,591,820 B2 | * | 7/2003 | Kitano et al. ............... | 123/572 |
| 6,626,163 B1 | * | 9/2003 | Busen et al. ................ | 123/572 |

* cited by examiner

*Primary Examiner*—Marguerite McMahon
(74) *Attorney, Agent, or Firm*—Alleman Hall McCoy Russell & Tuttle LLP (57) ABSTRACT

An oil separator comprises an oil chamber having a first space on an upper side and a second space on a lower side which communicate with each other. An air-fuel mixture transport pipe is connected to a peripheral portion of the oil chamber so as to communicate with the second space. An oil discharge pipe is connected to a lower end portion of the oil chamber. A blow-by gas discharge pipe is connected to an upper end portion of the oil chamber. The second space communicates with the first space so as to inhibit the oil from flowing from the second space into the first space. The first space communicates with the blow-by gas discharge pipe so as to inhibit the oil from flowing from the first space into the blow-by gas discharge pipe. The flow direction at one end portion of the air-fuel mixture transport pipe substantially corresponds with the circumferential direction of the oil chamber.

12 Claims, 7 Drawing Sheets

OIL SEPARATOR FOR ENGINE, AND PERSONAL WATERCRAFT

BACKGROUND OF THE INVENTION

1. Field of the Invention

The present invention relates to an oil separator for an engine which is configured to separate a liquid from a gas, and a personal watercraft comprising the oil separator.

2. Description of the Related Art

In recent years, four-cycle engines have been mounted in certain jet-propulsion personal watercraft provided with water jet pumps. In the engines, the internal crankcase pressure varies with the reciprocation of pistons. Accordingly, the engine is provided with a breather passage to reduce an increased internal pressure of the crankcase. The breather passage is connected to an air-intake system such as an air cleaner box to inhibit an excessive increase in the internal pressure of the crankcase.

Meanwhile, a chamber of the crankcase or an inside of a cylinder head connected to the chamber of the crankcase through a chain tunnel or the like, is full of oil in a mist state (oil mist). In order to inhibit a blow-by gas of the engine that contains the oil mist (hereinafter referred to as a liquid air-fuel mixture) from flowing into the air cleaner box through the breather pipe and the oil in the blow-by gas from flowing into the air-intake system, the breather passage of the engine is typically provided with an oil separator for separating the liquid air-fuel mixture into the oil and the gas.

The oil separator is configured to have an oil chamber having an inner space of a predetermined volume which is typically separated by a number of separating plates, thus forming a labyrinth structure. The blow-by gas with the oil mist that flows into the oil separator flows along passages formed by the separating plates provided within the inner space. While flowing along the passages, the oil contained in the blow-by gas collides with the separating plates and adheres to these plates. In this manner, the liquid air-fuel mixture flowing into the oil separator is separated into the gas and the oil. The gas is drawn into the air-intake system through the breather passage, and the oil is returned to an oil pan through an oil return passage.

In the conventional engine, as disclosed in Japanese Patent No. 3124743, an oil separator is provided at a connecting face between a crankcase and an oil pan, or a chamber independently provided within a cylinder head is configured to have a labyrinth-structured inner space which functions as an oil separator.

By the way, in the case of the jet-propulsion personal watercraft, a vertical dimension of the engine is inevitably limited because of restrictions such as a narrow inner space or center of gravity of a body. However, when the oil separator is provided at the above described location, the vertical dimension of the engine tends to be increased. Such an engine is difficult to mount in the narrow inner space within the body.

In the conventional oil separator having a labyrinth structure, the passages formed by a number of separating plates are relatively narrow, and are sometimes clogged with the separated oil. The oil that has clogged the passages is pushed into the breather passage by the blow-by gas and is carried into the air-intake system.

When the oil pan has a sufficient volume, the oil is also separated from the gas within an inner space of the oil pan. However, since the vertical dimension of the engine of the personal watercraft is limited as described above, a sufficient volume of the oil pan is difficult to gain. When the liquid air-fuel mixture that contains relatively large amount of oil might flow into the conventional oil separator having a labyrinth structure, the oil is not satisfactorily separated from the gas.

SUMMARY OF THE INVENTION

The present invention addresses the above described conditions, and an object of the present invention is to provide an oil separator having a high capability of separating a liquid air-fuel mixture into a gas and oil and being manufactured with high productivity, without increasing a vertical dimension of an engine, and a jet-propulsion personal watercraft in which the engine provided with the oil separator is mounted.

According to the present invention, there is provided an oil separator for an engine which is configured to separate a liquid from a gas, comprising a tubular oil chamber provided with its center axis extending substantially in a vertical direction, the oil chamber having closed upper and lower opening ends; an air-fuel mixture transport pipe connected to a peripheral portion of the oil chamber so as to communicate with an inner space thereof, the air-fuel mixture transport pipe being configured to transport a liquid air-fuel mixture into the oil chamber; a gas discharge pipe connected to an upper end portion of the oil chamber so as to communicate with the inner space thereof, to allow the gas to be discharged from the oil chamber through the gas discharge pipe; and a liquid discharge pipe connected to a lower end portion of the oil chamber so as to communicate with the inner space thereof, to allow the liquid to be discharged from the oil chamber through the liquid discharge pipe, wherein a connecting end portion of the gas discharge pipe opens downwardly within the oil chamber, and a connecting end portion of the air-fuel mixture transport pipe is placed in the vicinity of an inner peripheral face of the oil chamber so as to open in a circumferential direction of the oil chamber.

In the oil separator so configured, the liquid air-fuel mixture (e.g., blow-by gas containing oil mist) is blown into the oil chamber in the circumferential direction through the air-fuel mixture transport pipe. As a result, the oil mixed in the gas adheres to an inner peripheral face of the oil chamber by a centrifugal force. Thus, the oil is separated from the gas. The separated gas is discharged from the gas discharge pipe located above and the separated oil is discharged from the liquid discharge pipe located below. Unlike in the conventional oil separator, the oil separator of the present invention does not have a labyrinth structure provided with the passages that would be clogged with the separated oil.

Since the oil separator can be externally attached on the engine body, the height of the engine body need not be increased, and therefore, such an oil separator is suitable for use in the personal watercraft having a limited inner space. The separating capability of the oil separator is less affected by the amount of oil mist contained in the blow-by gas.

The connecting end portion of the gas discharge pipe may protrude into the inner space of the oil chamber, and the air-fuel mixture transport pipe may open at a location higher than an opening end of the gas discharge pipe.

In the oil separator so configured, the connecting end portion of the gas discharge pipe protrudes into an inside of the oil chamber so as to open downwardly, and the oil moving downwardly by gravity within the oil chamber is inhibited from flowing from the oil chamber into the gas discharge pipe. In addition, since the connecting end portion of the air-fuel mixture transport pipe is located higher than the opening end of the gas discharge pipe, and a flow direction at the connecting end of the transport pipe differs from a flow direction at the opening end of the gas discharge pipe, the oil mist flowing from the air-fuel mixture transport pipe into the oil chamber is not discharged directly from the gas discharge pipe, and therefore, the amount of oil contained in the gas being discharged can be reduced.

The oil separator may further comprise a separating member provided in the inner space within the oil chamber to define a first space on an upper side and a second space on a lower side, and the separating member may be provided with a penetrating hole to allow the first space and the second space to communicate with each other, an upper end portion of a pipe member may be connected to a lower face of the separating member so as to communicate with the penetrating hole, and a lower end portion of the pipe member may open downwardly, the connecting end portion of the gas discharge pipe may protrude into the first space, and the connecting end portion of the air-fuel mixture transport pipe may communicate with the second space and is located higher than the lower end portion of the pipe member.

In the oil separator so configured, the liquid air-fuel mixture flowing into the oil separator is first separated into the oil and the gas within the second space and is further separated into the oil and the gas within the first space. Therefore, the liquid air-fuel mixture is reliably separated into the oil and the gas.

The penetrating hole may have a diameter smaller than a diameter of the upper end portion of the pipe member. In the oil separator so configured, since the passage extending from the pipe member to the first space through the penetrating hole is configured to have a diameter reduced at the penetrating hole, the oil within the second space is inhibited from flowing into the first space through the penetrating hole. Therefore, the liquid air-fuel mixture is reliably separated into the oil and the gas.

The connecting end portion of the gas discharge pipe may have a diameter smaller than a diameter of the lower end portion of the pipe member. In the oil separator so configured, an exit of the first space (connecting end portion of the gas discharge pipe) has a diameter smaller than a diameter of an exit of the second space (lower end portion of the pipe member). Such a structure inhibits the oil from being discharged from the gas discharge pipe.

The oil chamber may be configured such that the opening ends of a tubular member are closed by closing members having an identical shape. In the oil separator so configured, common parts may be used for the closing members, and therefore, productivity is increased.

The oil chamber may be configured such that the opening ends of a tubular member are closed by closing members having a shape identical to a shape of the separating member. In the oil separator so configured, common parts may be used for the closing members and the separating member, and therefore, productivity is increased.

The tubular member may be cylindrical. In the cylindrical oil separator, since the liquid air-fuel mixture flows smoothly in the circumferential direction along the inner peripheral face of the oil chamber, the oil is reliably separated from the liquid air-fuel mixture by a centrifugal force. In addition, commercially available cylindrical pipe may be used as the oil separator, and therefore, productivity is increased.

The liquid air-fuel mixture may be a blow-by gas of the engine. The oil is reliably separated from the blow-by gas with the above mentioned configuration.

The oil separator may be equipped in the engine mounted in a jet-propulsion personal watercraft. Since the engine has the oil separator, the vertical dimension of the engine is not increased. Such an engine is suitable for use in a limited inner space of the personal watercraft.

According to the present invention, there is further provided a personal watercraft comprising a body formed by a hull and a deck; an engine body mounted in the body; an air-intake system configured to draw air taken in from outside into the engine body; and an oil separator configured to separate a blow-by gas discharged from the engine body into a gas and a liquid, the oil separator including a tubular oil chamber provided with its center axis extending substantially in a vertical direction, the oil chamber having closed upper and lower opening ends; an air-fuel mixture transport pipe connected to a peripheral portion of the oil chamber so as to communicate with an inner space thereof, the air-fuel mixture transport pipe being configured to transport the blow-by gas from the engine body into the oil chamber; a blow-by gas discharge pipe connected to an upper end portion of the oil chamber so as to communicate with the inner space thereof, to allow the blow-by gas to be discharged from the oil chamber through the blow-by gas discharge pipe; and an oil discharge pipe connected to a lower end portion of the oil chamber so as to communicate with the inner space thereof, to allow the oil to be discharged from the oil chamber through the oil discharge pipe, wherein a connecting end portion of the blow-by gas discharge pipe opens downwardly within the oil chamber, and a connecting end portion of the air-fuel mixture transport pipe is placed in the vicinity of an inner peripheral face of the oil chamber so as to open in a circumferential direction of the oil chamber, wherein at least part of the air-intake system is located on a first side of right and left sides of the body with respect to the engine body, the oil chamber of the oil separator is placed on a second side of the right and left sides with respect to the engine body, and the blow-by gas discharge pipe extends from the oil chamber to the part of the air-intake system located on the first side with respect to the engine body.

In the personal watercraft so configured, when the personal watercraft is inclined either to the right or to the left, the oil is inhibited from flowing into the air-intake system. For example, the air cleaner partially forming the air-intake system is placed on the right side of the body with respect to the engine body, and the oil chamber forming the oil separator is placed on the left side. The air cleaner and the oil chamber are connected to each other through the blow-by gas discharge pipe. And, the oil separator and the oil pan at the lower portion of the engine body are connected to each other through the oil discharge pipe.

In this configuration, when the watercraft is inclined to the right side, the oil separator is located higher than the engine body, and therefore, the oil reserved in the oil pan does not flow into the oil separator through the oil discharge pipe. Thus, the oil is inhibited from flowing into the air cleaner. On the other hand, when the watercraft is inclined to the left, the air cleaner is located higher than the oil separator, and therefore, the oil is inhibited from flowing into the air cleaner through the gas discharge pipe.

The above and further objects and features of the invention will more fully be apparent from the following detailed description with accompanying drawings.

DETAILED DESCRIPTION OF THE PREFERRED EMBODIMENTS

Figure 1:
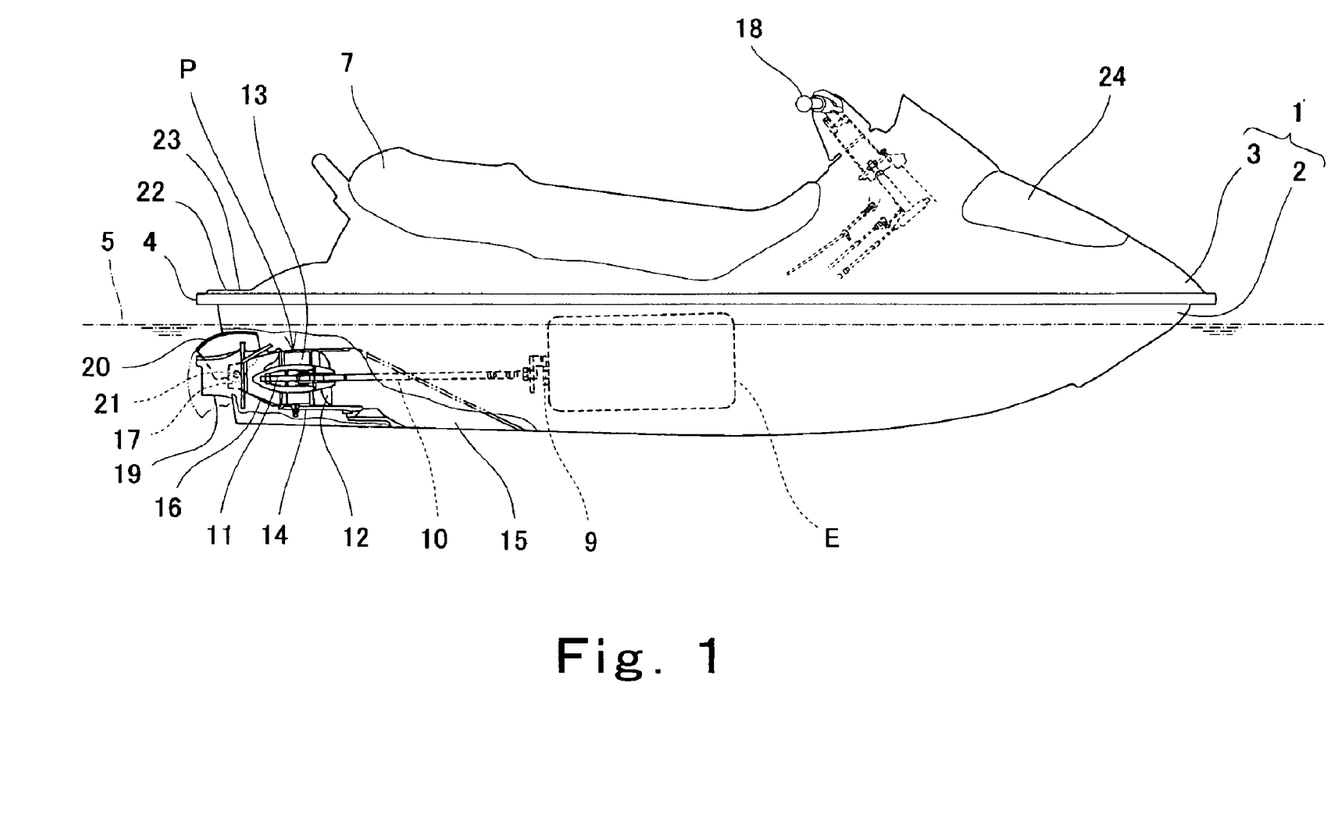
FIG. 1 is a side view of a personal watercraft according to an embodiment of the present invention.

An oil separator according to embodiments of the present invention will be described with reference to the drawings. Here, a personal watercraft in which an engine having the oil separator is mounted, will be described with reference to the drawings. The personal watercraft in FIG. 1 is a straddle-type personal watercraft provided with a seat straddled by an operator. In the watercraft in FIG. 1, a body 1 of the watercraft comprises a hull 2 and a deck 3 covering the hull 2 from above. A line at which the hull 2 and the deck 3 are connected over the entire perimeter thereof is called a gunnel line 4. The gunnel line 4 is located above a waterline 5 of the watercraft.

Figure 2:
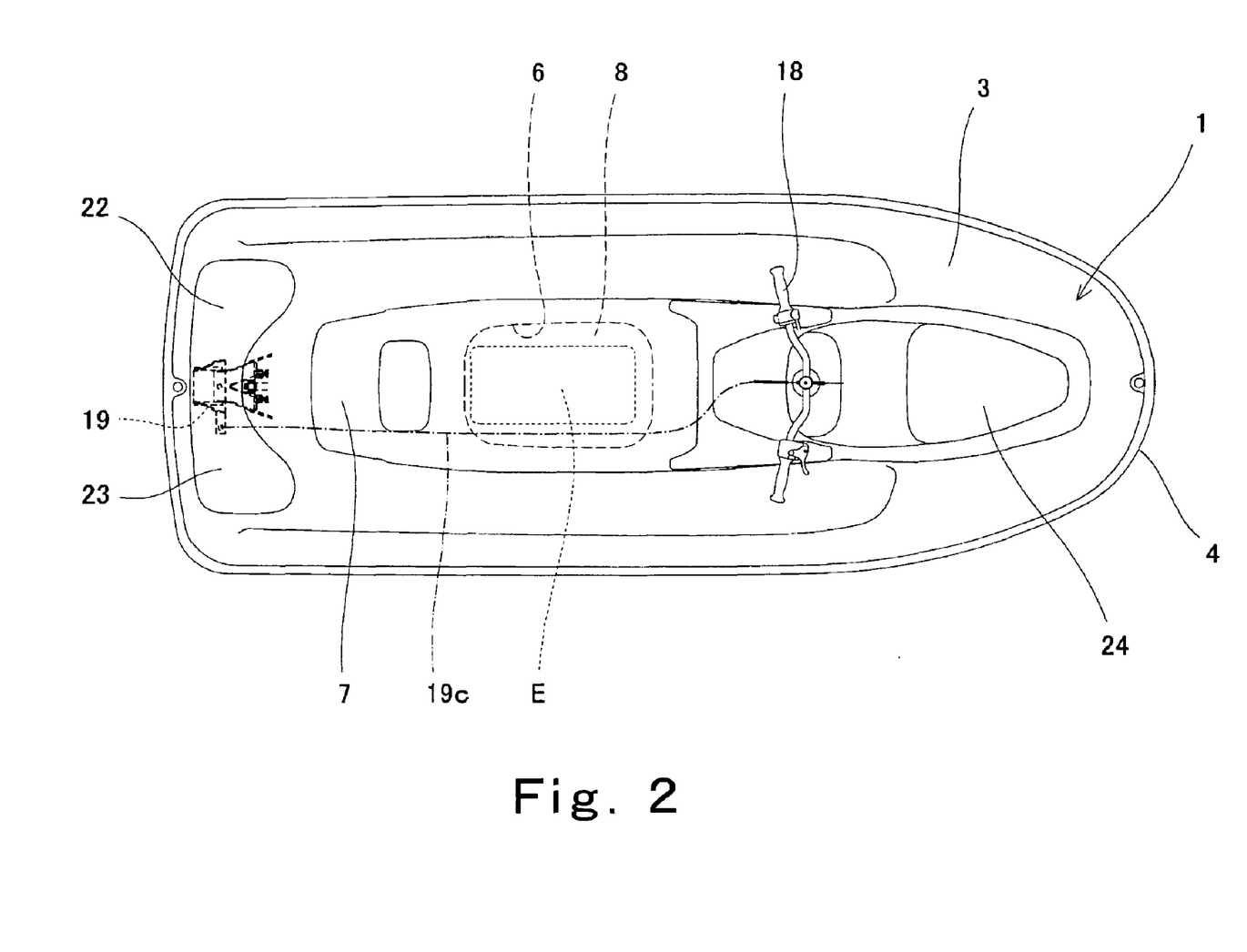
FIG. 2 is a plan view of the personal watercraft in FIG. 1.

As shown in FIG. 2, an opening 6, which has a substantially rectangular shape as seen from above is formed at a substantially center section of the deck 3 in the upper portion of the body 1 such that its longitudinal direction corresponds with the longitudinal direction of the body 1. A seat 7 is removably mounted over the opening 6.

An engine room 8 is provided in a space defined by the hull 2 and the deck 3 below the opening 6. An engine E for driving the personal watercraft is mounted within the engine room 8. The engine room 8 has a convex-shaped transverse cross-section and is configured such that its upper portion is smaller than its lower portion. In this embodiment, the engine E is an in-line four-cylinder four-cycle engine. As shown in FIG. 1, the engine E is mounted such that a crankshaft 9 extends along the longitudinal direction of the body 1.

An output end of the crankshaft 9 is rotatably coupled integrally with a pump shaft 11 of a water jet pump P provided on the rear side of the body 1 through a propeller shaft 10. An impeller 12 is attached on the pump shaft 11. Fairing vanes 13 are provided behind the impeller 12. The impeller 12 is covered with a pump casing 14 on the outer periphery thereof.

A water intake 15 is provided on the bottom of the body 1. The water intake 15 is connected to the pump casing 14 through a water passage. The pump casing 14 is connected to a pump nozzle 16 provided on the rear side of the body 1. The pump nozzle 16 has a cross-sectional area that gradually reduces rearward, and an outlet port 17 is provided on the rear end of the pump nozzle 16.

The water outside the watercraft is sucked from the water intake 15 and fed to the water jet pump P. The water jet pump P pressurizes and accelerates the water and the fairing vanes 13 guide water flow behind the impeller 12. The water is ejected through the pump nozzle 16 and from the outlet port 17, and, as the resulting reaction, the watercraft obtains a propulsion force.

In FIGS. 1 and 2, reference numeral 18 denotes a bar-type steering handle. The steering handle 18 is connected to a steering nozzle 19 provided behind the pump nozzle 16 through a cable 19c (indicated by a dashed line in FIG. 2). When the rider rotates the handle 18 clockwise or counterclockwise, the steering nozzle 19 is swung toward the opposite direction so that the ejection direction of the water being ejected through the pump nozzle 16 can be changed, and the watercraft can be correspondingly turned to any desired direction while the water jet pump P is generating the propulsion force.

As shown in FIG. 1, a bowl-shaped reverse deflector 20 is provided on the rear side of the body 1 so as to have the steering nozzle 19 inside the deflector 20 such that it can vertically swing around a horizontally mounted swinging shaft 21. The deflector 20 is swung downward to a lower position around the swinging shaft 21 to deflect the ejected water from the steering nozzle 19 forward, and, as the resulting reaction, the personal watercraft moves rearward.

In FIGS. 1 and 2, a rear deck 22 is provided in the rear section of the body 1. The rear deck 22 is provided with an openable rear hatch cover 23. A rear compartment (not shown) with a small capacity is provided under the rear hatch cover 23. In FIGS. 1 and 2, a front hatch cover 24 is provided in a front section of the body 1. A front compartment (not shown) is provided under the front hatch cover 24 for storing equipments and the like.

Figure 3:
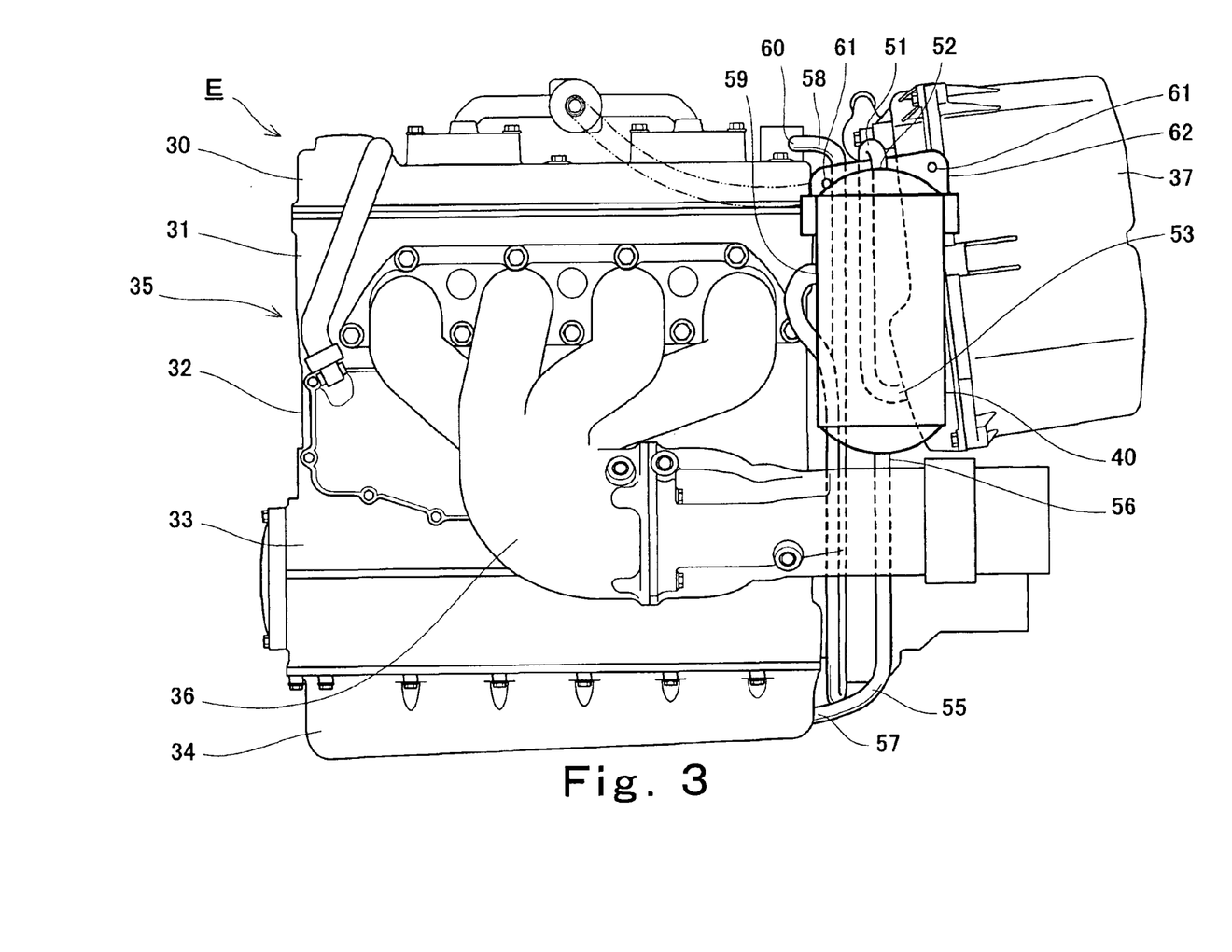
FIG. 3 is a side view of an engine.

FIG. 3 is a side view of the engine E. The engine E is an in-line four-cylinder four-cycle engine as described above. The engine E comprises an engine body 35 having a cylinder head 31 covered by a cylinder head cover 30, a cylinder block 32, a crankcase 33, and an oil pan 34, which are arranged and connected to one another in this order, from above.

The engine E comprises an exhaust manifold 36 connected to the cylinder head 31, an air-intake pipe (not shown), an air-cleaner box 37 provided behind the engine body 35, and an oil separator 40 provided behind the engine body 35 and laterally of the air cleaner box 37. The oil separator 40 serves to separate a blow-by gas containing oil mist (liquid air-fuel mixture) into a gas and oil, as mentioned later. An inner space of the cylinder head 31 and a chamber of the crankcase 33 communicate with each other through a chain tunnel (not shown).

Figure 4:
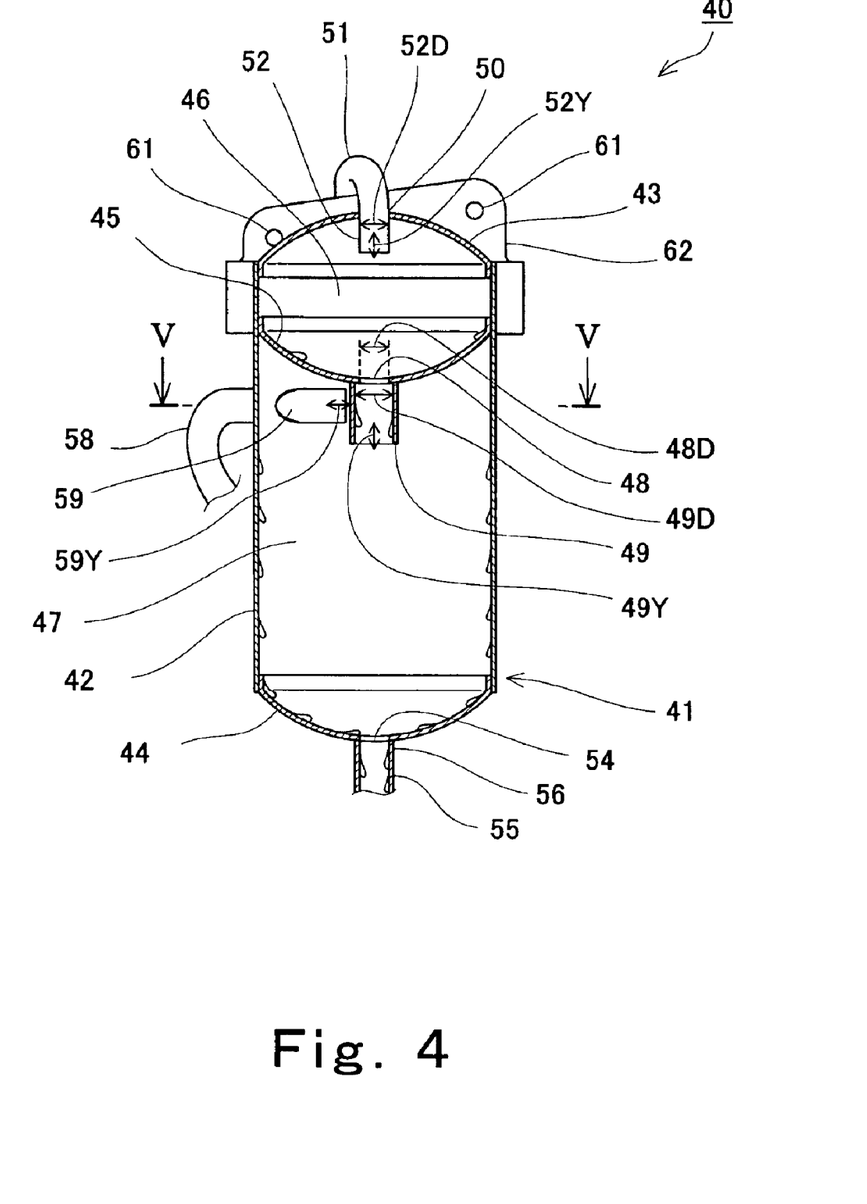
FIG. 4 is a longitudinal sectional view showing a configuration of an oil separator.
Figure 5:
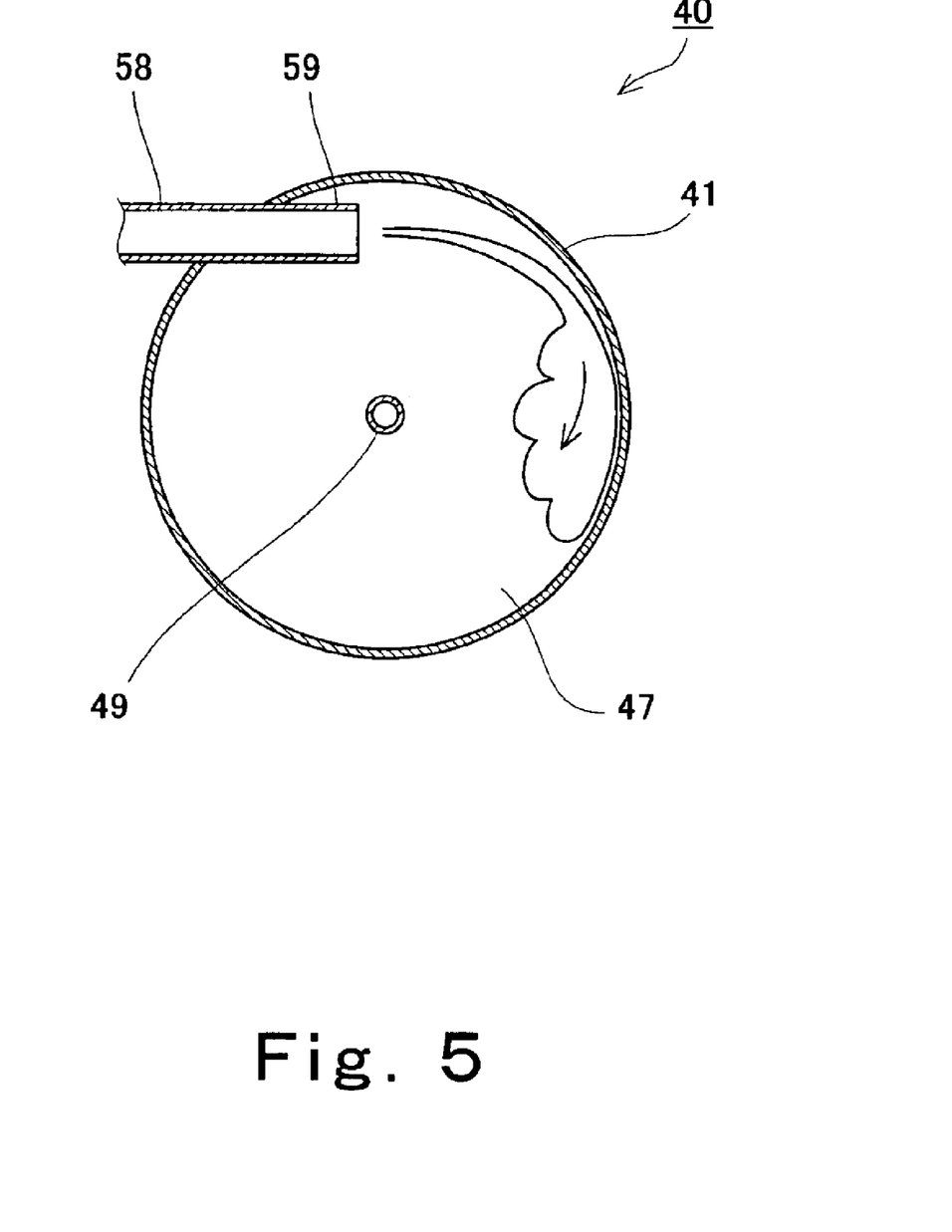
FIG. 5 is a cross-sectional view taken in the direction of arrows along line V—V in the oil separator in FIG. 3.

FIG. 4 is a longitudinal sectional view showing a configuration of the oil separator 40, and FIG. 5 is a cross-sectional view taken in the direction of arrows along line V—V in the oil separator 40 in FIG. 4. As shown in FIG. 4, the oil separator 40 has an oil chamber 41 that is hollow and elongate in the vertical direction, i.e., tubular. The oil chamber 41 has a cylindrical tubular member 42 having upper and lower opening ends, and a bowl-shaped upper end closing member 43 and a bowl-shaped lower end closing member 44 for closing the upper opening end and the lower opening end of the tubular member 42, respectively.

More specifically, an edge portion of the upper end closing member 43 is connected to an edge portion of the upper opening end of the tubular member 42 such that the upper end closing member 43 opens downwardly, and an edge portion of the lower end closing member 44 is connected to an edge portion of the lower opening end of the tubular member 42 such that the lower end closing member 44 opens upwardly. As a result, the tubular member 42, the upper end closing member 43, and the lower end closing member 44 form the oil chamber 41 having an inner space. The shape of the tubular member 42 is not intended to be limited to a cylindrical shape, but may be a polygon-shaped in transverse cross-section.

A bowl-shaped separating member 45 is provided within the tubular member 42 so as to open upwardly. An edge portion of the separating member 45 is fixed to an inner peripheral portion of the tubular member 42. Within the inner space of the oil chamber 41, the separating member 45 defines a first space 46 on the upper side and a second space 47 on the lower side.

A penetrating hole 48 is formed substantially at the center position of the separating member 45 to allow the first space 46 and the second space 47 to communicate with each other. An upper end portion of a tubular pipe member 49 is fixed to a lower face of the separating member 45 so as to communicate with the penetrating hole 48. Therefore, the first space 46 and the second space 47 communicate with each other so as to inhibit the oil from flowing from the second space 47 into the first space 46.

An opening diameter 48D of the penetrating hole 48 is smaller than an inner diameter 49D of an upper end portion of the pipe member 49. Because of the smaller diameter of the penetrating hole 48, the oil is inhibited from moving from the pipe member 49 into the first space 46 through the penetrating hole 48. A lower end portion of the pipe member 49 opens downwardly, and a flow direction (opening direction) at its opening end (arrow 49Y in FIG. 4) substantially corresponds with the vertical direction.

The upper end closing member 43, the lower end closing member 44, and the separating member 45 are formed by common parts. Thus, since the oil separator 40 of this embodiment has a plurality of common parts, productivity is increased. It should be appreciated that the upper end closing member 43, the lower end closing member 44, and the separating member 45 are not intended to be limited to the above mentioned bowl shape, but may be flat-plate shaped.

A penetrating hole 50 is formed substantially at the center position of the upper end closing member 43. One end portion (connecting end portion) 52 of a blow-by gas discharge pipe (gas discharge pipe) 51 extends through the penetrating hole 50 to protrude into the first space 46 of the oil chamber 41. The one end portion 52 opens downwardly, and a flow direction (opening direction) at its opening end (see arrow 52Y in FIG. 4) substantially corresponds with the vertical direction. Therefore, the upper end closing member 43 and the blow-by gas discharge pipe 51 are connected to each other so as to inhibit the oil from flowing from the first space 46 of the oil chamber 41 into the blow-by gas discharge pipe 51.

As shown in FIG. 3, the other end portion 53 of the blow-by gas discharge pipe 51 is connected to the air cleaner box 37. An opening diameter 52D of the one end portion 52 of the blow-by gas discharge pipe 51 is set smaller than an inner diameter 49D of the pipe member 49.

A penetrating hole 54 is formed substantially at the center position of the lower end closing member 44. One end portion (connecting end portion) 56 of an oil discharge pipe (liquid discharge pipe) 55 is connected to a lower face of the lower end closing member 44 so as to communicate with the penetrating hole 54. The other end portion 57 of the oil discharge pipe 55 is connected to the oil pan 34 as shown in FIG. 3.

The blow-by gas containing oil mist is transported through a air-fuel mixture transport pipe 58. One end portion (connecting end portion) 59 of the air-fuel mixture transport pipe 58 is connected to a peripheral portion of the oil chamber 41 and the other end portion 60 thereof is connected to the cylinder head cover 30 as shown in FIG. 3. Therefore, the oil chamber 41 communicates with the cylinder head 31. In this embodiment, as shown in FIGS. 4 and 5, the one end portion 59 of the air-fuel mixture pipe 58 protrudes into the second space 47 within the oil chamber 41.

As shown in FIG. 5, the one end portion 59 of the air-fuel mixture transport pipe 58 is positioned in the vicinity of the inner peripheral face of the oil chamber 41. As shown in FIG. 4, the one end portion 59 is configured to open at a location higher than the lower end of the pipe member 49. The one end portion 59 opens in the circumferential direction of the tubular member 42. Therefore, a flow direction (opening direction) at the one end portion 59 (see arrow 59Y in FIG. 4) substantially corresponds with the circumferential direction of the tubular member 42.

As shown in FIG. 3, a flow passage of the air-fuel mixture transport pipe 58, extends downwardly from the other end portion 60 connected to the cylinder head cover 30 and is turned back at the vicinity of the oil pan 34 so as to extend upwardly to reach the one end portion 59 connected to the oil chamber 41. Therefore, when the personal watercraft is greatly inclined to the right or to the left, the oil is inhibited from outflowing from the cylinder head 31 into the oil separator 40. A bracket 62 having screw holes 61 is welded to an upper portion of the oil separator 40 and screwed to a vicinity of the opening 6 on an upper surface of the deck 2 of the body 1 of the watercraft.

In the engine E configured as described above, the flow passage formed by the air-fuel mixture transport pipe 58, the oil chamber 41, and the blow-by gas discharge pipe 51 create a breather passage of the engine, and the inner space of the cylinder head 31 and the inner space of the air cleaner box 37 communicate with each other. In this structure, when an internal pressure of the crankcase 33 increases, the blow-by gas of the engine E containing oil mist flows from the cylinder head 31 connected to the crankcase 33 through the chain tunnel into the second space 47 of the oil separator 40 through the air-fuel mixture transport pipe 58.

Inside the second space 47 of the oil separator 40, the blow-by gas flows along the flow direction 59Y at the one end portion 59 of the air-fuel mixture transport pipe 58, i.e., along the circumferential direction of the oil chamber 41 (see FIG. 5). The oil mist in the blow-by gas is separated from the gas by a centrifugal force generated by movement of the blow-by gas within the oil chamber 41. The separated oil mist is liquefied and adheres to an inner wall of the oil chamber 41. The separated oil moves downwardly along the inner wall of the oil chamber 41 and is returned to the oil pan 34 through the oil discharge pipe 55.

The oil separator 40 utilizes the centrifugal force generated by the movement of the oil mist along the circumferential direction of the oil chamber 41. Therefore, even when the blow-by gas containing a large amount of oil mist flows into the oil separator 40, the oil is reliably separated from the gas. In addition, the oil separator 40 does not have a labyrinth structure provided with passages that would be clogged with the separated oil.

Meanwhile, the blow-by gas from which the oil has been separated, moves from the second space 47 into the first space 46 through the pipe member 49. As described above, since the opening end of the one end portion 59 of the air-fuel mixture transport pipe 58 is located higher than the lower end of the pipe member 49, and the flow direction 59Y at the one end portion 59 (exit portion) of the air-fuel mixture transport pipe 58 is perpendicular to the flow direction 49Y at the lower end of the pipe member 49. Therefore, the blow-by gas containing the oil mist that flows from the air-fuel mixture transport pipe 58 into the second space 47 is inhibited from flowing into the first space 46 directly through the pipe member 49.

As described above, since the oil is inhibited from flowing from the second space 47 into the pipe member 49, and further, since the oil is inhibited from flowing from the pipe member 49 into the first space 46 through the penetrating hole 48 of the separating member 45, the oil is inhibited from flowing from the second space 47 into the first space 46.

The blow-by gas moving into the first space 46 sometimes contains some oil mist. But, since the oil mist moves into a wider space of the first space 46 through the penetrating hole 48 of the separating member 45 and expands therein, separation of the oil from the gas is facilitated. The oil separated within the first space 46 drops into the second space 47 through the penetrating hole 48 and the pipe member 49, and is returned to the oil pan 34 through the oil discharge pipe 55.

The blow-by gas from which the oil has been separated within the second space 47 and the first space 46 flows into the air cleaner box 37 through the blow-by gas discharge pipe 51. Since the first space 46 and the blow-by gas discharge pipe 51 communicate with each other so as to inhibit the oil from flowing from the first space 46 into the blow-by gas discharge pipe 51 as described above, the oil is further inhibited from being discharged through the blow-by gas discharge pipe 51.

The oil separator 40 configured as described above is capable of reliably separating the blow-by gas containing a large amount of oil mist into the oil and the gas and of inhibiting the oil from flowing into the air-intake system. And, the separated gas is discharged into the air-intake system and the separated oil is returned to the oil pan 34. Further, since the oil separator 40 is externally attached on the engine body 35, the height of the engine E is not increased. Therefore, the oil separator 40 is suitable for use in a limited space of the personal watercraft.

Figure 6:
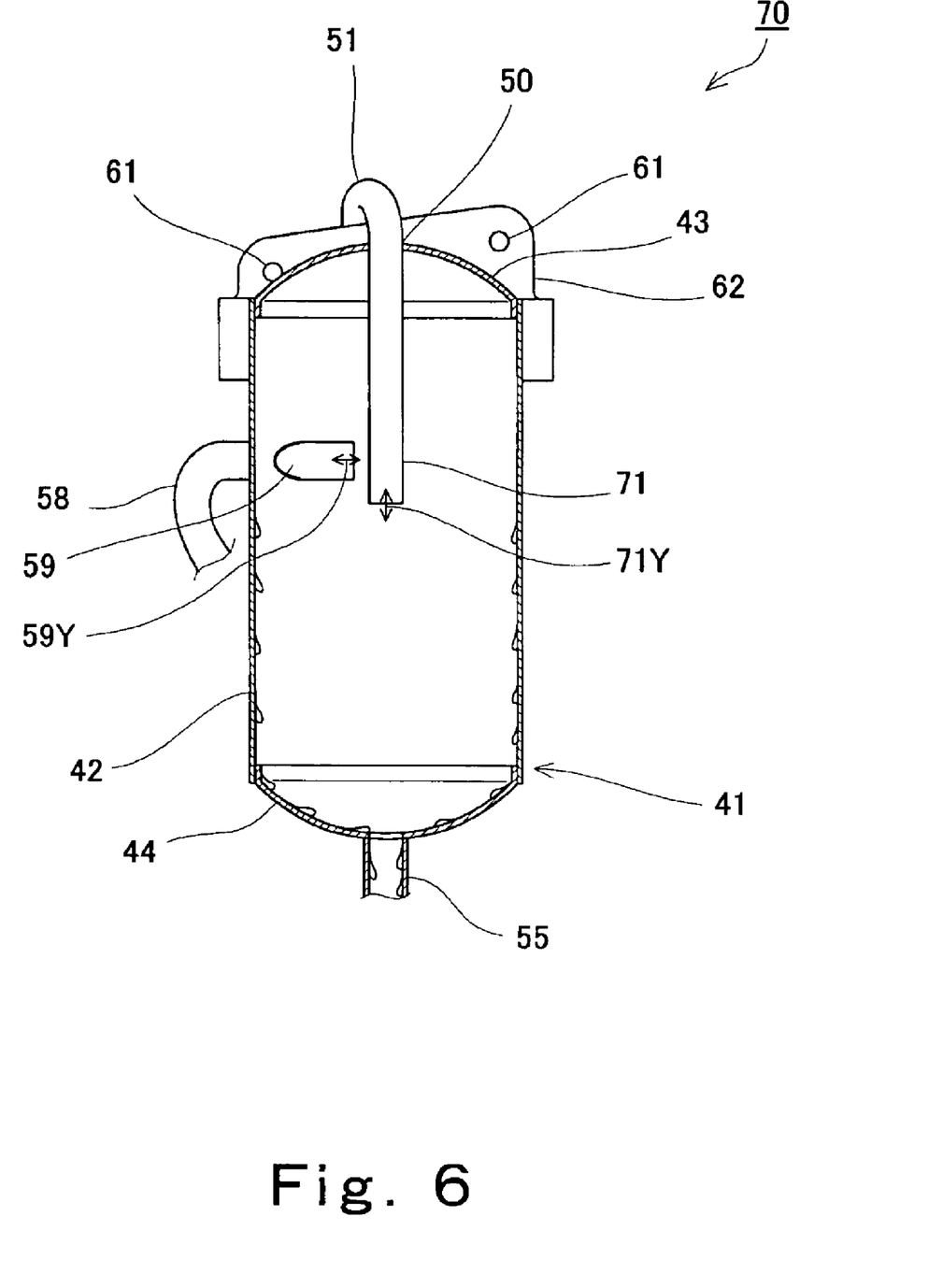
FIG. 6 is a longitudinal sectional view showing the oil separator having a single inner space.

The oil separator 40 in this embodiment has two inner spaces. Alternatively, the oil separator 40 may have only one inner space, or three or more inner spaces. FIG. 6 is a longitudinal sectional view showing an oil separator 70 having only one inner space.

The separating member 45 and the pipe member 49 are not provided on the oil separator 70 in FIG. 6, unlike in the oil separator 40 in FIG. 4. The blow-by gas discharge pipe 51 protruding through the penetrating hole 50 of the upper end closing member 43 into the oil chamber 41 is configured such that one end portion (connecting end portion) 71 extends to a position lower than one end portion 59 of the air-fuel mixture transport pipe 58. The one end portion 71 opens downwardly, and a flow direction (opening direction) at the one end portion 71 (see arrow 71Y in FIG. 6) substantially corresponds with the vertical direction. In FIG. 6, the same reference numerals as those in FIG. 4 denote the same or corresponding parts, which will not be further described.

In the oil separator 70 configured as described above, the blow-by gas containing the oil mist, inflowing from the air-fuel mixture transport pipe 58, flows along the inner peripheral face of the tubular member 42, as in the above mentioned oil separator 40. By the centrifugal force, the oil adheres to the inner wall of the oil chamber 41. Thus, even in the case of the blow-by gas containing a large amount of oil mist, the oil is well separated from the blow-by gas.

As described above, the one end portion 71 of the blow-by gas discharge pipe 51 opens at the location lower than the one end portion 59 of the air-fuel mixture transport pipe 58 and the flow direction 59Y at the one end portion 59 of the air-fuel mixture transport pipe 58 is perpendicular to the flow direction 71Y at the one end portion 71 of the gas discharge pipe 51, the oil mist flowing from the air-fuel mixture transport pipe 58 into the oil chamber 41 is inhibited from being discharged directly through the blow-by gas discharge pipe 51.

Figure 7:
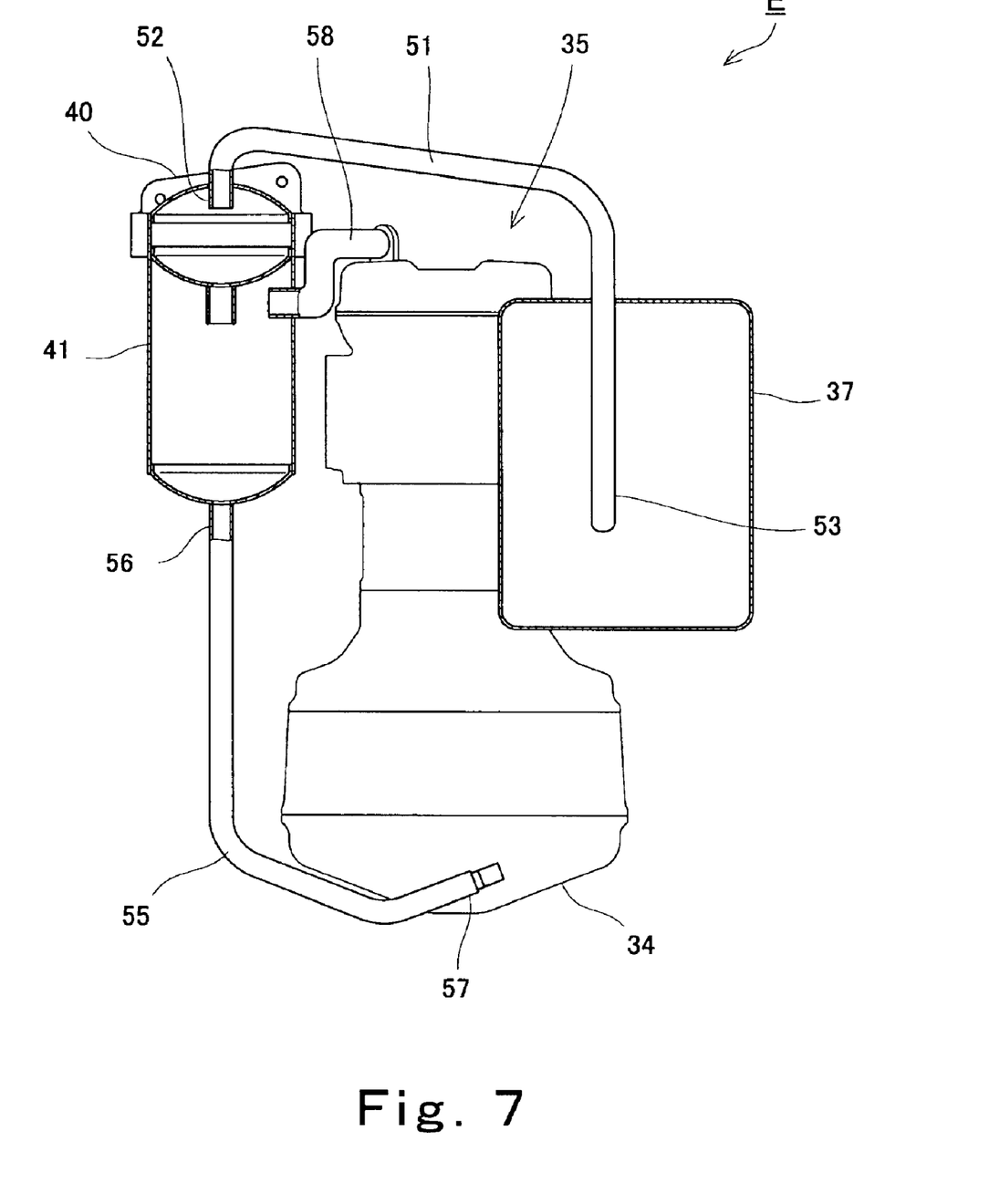
FIG. 7 is a rear view of an engine, showing placement of the oil separator and an air cleaner box.

By devising placement of the oil separator and the air-intake system, the oil is inhibited from flowing into the air-intake system. FIG. 7 is a rear view of the engine E, showing placement of the oil separator 40 and the air cleaner box 37. As shown in FIG. 7, the oil chamber 41 forming the oil separator 40 is placed on the left side of the watercraft relative to the engine body 35, and the air cleaner box 37 is placed on the right side of the watercraft relative to the engine body 35.

The one end portion 52 of the blow-by gas discharge pipe 51 is connected to the oil separator 40, and the other end portion 53 thereof is connected to the air cleaner box 37. Thus, the blow-by gas discharge pipe 51 extends from the left side to the right side of the engine E in FIG. 7. The one end portion 56 of the oil discharge pipe 55 is connected to the oil separator 40, and the other end portion 57 thereof is connected to the oil pan 34 substantially at a center position in the lateral direction of the engine E.

In the above configuration, when the watercraft is inclined 90 degrees to the right side, the oil chamber 41 is located higher than the position where the other end portion 57 of the oil discharge pipe 55 is connected to the oil pan 34, and therefore, the oil in the oil pan is inhibited from flowing into the oil chamber 41 through the oil discharge pipe 55. As a result, the oil is inhibited from flowing from the oil pan 34 into the air-cleaner box 37 through the oil separator 40. On the other hand, when the watercraft is inclined 90 degrees to the left, the air cleaner box 37 is located higher than the oil separator 40, and therefore the oil is inhibited from flowing from the oil chamber 41 into the air cleaner box 37 through the blow-by gas discharge pipe 51.

As a matter of course, in the configuration in FIG. 7, the oil separator 40 may be replaced by the oil separator 70. Also, in such a configuration, the positional relationship between the oil separator 40 and the air cleaner box 37 in the lateral direction may be reversed.

In the configuration in FIG. 7, the blow-by gas discharge pipe 51 is connected to the air cleaner box 37. Alternatively, the blow-by gas discharge pipe 51 may communicate with other components belonging to the air-intake system, such as a throttle tube or an air-intake pipe. It should be appreciated that, the blow-by gas discharge pipe 51 is connected to the air-intake system at a location on the opposite side of the oil separator 40 with respect to the engine body 35 in the lateral direction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. An oil separator for an engine, which is configured to separate a liquid from a gas, comprising:
   a tubular oil chamber provided with its center axis extending substantially in a vertical direction, the oil chamber having closed upper and lower opening ends;
   an air-fuel mixture transport pipe connected to a peripheral portion of the oil chamber so as to communicate with an inner space thereof, the air-fuel mixture transport pipe being configured to transport a liquid air-fuel mixture into the oil chamber;

a gas discharge pipe connected to an upper end portion of the oil chamber so as to communicate with the inner space thereof, to allow the gas to be discharged from the oil chamber through the gas discharge pipe, a liquid discharge pipe connected to a lower end portion of the oil chamber so as to communicate with the inner space thereof, to allow the liquid to be discharged from the oil chamber through the liquid discharge pipe; and a separating member provided in the inner space within the oil chamber to define a first space on an upper side and a second space on a lower side;

wherein the separating member is provided with a penetrating hole to allow the first space and the second space to communicate with each other, an upper end portion of a pipe member is connected to a lower face of the separating member so as to communicate with the penetrating hole, and a lower end portion of the pipe member opens downwardly;

wherein a connecting end portion of the gas discharge pipe protrudes into the first space and opens downwardly within the oil chamber; and wherein a connecting end portion of the air-fuel mixture transport pipe is placed in the vicinity of an inner peripheral face of the oil chamber and located higher than the lower end portion of the pipe member such that the connecting end portion communicates with the second space of the oil chamber and opens in a circumferential direction of the oil chamber.

2. The oil separator for an engine according to claim 1, wherein the penetrating hole has a diameter smaller than a diameter of the upper end portion of the pipe member.

3. The oil separator for an engine according to claim 1, wherein the connecting end portion of the gas discharge pipe has a diameter smaller than a diameter of the lower end portion of the pipe member.

4. The oil separator for an engine according to claim 1, wherein the liquid air-fuel mixture is a blow-by gas of the engine.

5. The oil separator for an engine according to claim 1, being equipped in the engine mounted in a jet-propulsion personal watercraft.

6. An oil separator for an engine, which is configured to separate a liquid from a gas, comprising:

a tubular oil chamber provided with its center axis extending substantially in a vertical direction, the oil chamber having closed upper and lower opening ends;

an air-fuel mixture transport pipe connected to a peripheral portion of the oil chamber so as to communicate with an inner space thereof, the air-fuel mixture transport pipe being configured to transport a liquid air-fuel mixture into the oil chamber;

a gas discharge pipe connected to an upper end portion of the oil chamber so as to communicate with the inner space thereof, to allow the gas to be discharged from the oil chamber through the gas discharge pipe; and a liquid discharge pipe connected to a lower end portion of the oil chamber so as to communicate with the inner space thereof, to allow the liquid to be discharged from the oil chamber through the liquid discharge pipe;

wherein a connecting end portion of the gas discharge pipe opens downwardly within the oil chamber;

wherein a connecting end portion of the air-fuel mixture transport pipe is placed in the vicinity of an inner peripheral face of the oil chamber so as to open in a circumferential direction of the oil chamber; and wherein the oil chamber is configured such that opening ends of a tubular member are closed by closing members having an identical shape.

7. The oil separator for an engine according to claim 6, wherein the tubular member is cylindrical.

8. A personal watercraft comprising:

a body formed by a hull and a deck covering the hull from above, the body having an engine room inside thereof;

an engine body mounted within the engine room, the engine body having an associated crankshaft, a crankcase configured to accommodate the crankshaft, and an oil pan provided under the crankcase, the engine body being mounted such that the crankshaft extends along a longitudinal direction of the body;

an air-intake system configured to draw air taken in from outside into the engine body;

an oil separator configured to separate a blow-by gas discharged from the engine body into a gas and a liquid;

an air-fuel mixture transport pipe configured to connect the oil separator to the engine body;

a blow-by gas discharge pipe configured to connect an upper end portion of the oil separator to the air-intake system;

an oil discharge pipe configured to connect a lower end portion of the oil separator to the oil pan of the engine;

wherein the oil separator is located on one of right and left sides of the crankshaft, and the upper and lower end portions are situated along a substantially vertical axis that is perpendicular to a center axis of the crankshaft; and wherein part of the air-intake system is located on an opposite side of the crankshaft from the oil separator, such that the center axis of the crankshaft is located laterally intermediate the oil separator and the part of the air-intake system; and wherein the blow-by gas discharge pipe extends from the oil separator to the part of the air-intake system, the blow-by gas discharge pipe being coupled to the oil separator and to the part of the air-intake system at respective locations that are laterally remote from the center axis of the crankshaft.

9. The personal watercraft according to claim 8, wherein the part of the air-intake system is an air cleaner.

10. The personal watercraft according to claim 8, wherein the oil separator includes a tubular oil chamber extending along the substantially vertical axis of the oil separator intermediate the upper end portion and lower end portion of the oil separator;

wherein the air-fuel mixture transport pipe is connected to a peripheral portion of the oil chamber so as to communicate with an inner space thereof, the air-fuel mixture transport pipe being configured to transport a liquid air-fuel mixture into the oil chamber, the air-fuel mixture transport pipe having a connecting end portion placed in the vicinity of an inner peripheral face of the oil chamber so as to open in a circumferential direction of the oil chamber;

wherein the blow-by gas discharge pipe is connected to the upper end portion of the oil separator so as to communicate with the inner space thereof, to allow the blow-by gas to be discharged from the oil chamber through the blow-by gas discharge pipe, the blow-by gas discharge pipe having a connecting end portion which opens downwardly within the oil chamber; and wherein the oil discharge pipe is connected to the lower end portion of the oil separator so as to communicate with the inner space thereof, to allow the oil to be discharged from the oil chamber through the oil discharge pipe.

11. The personal watercraft according to claim 10, wherein the oil separator includes:

a separating member provided in the inner space within the oil chamber to define a first space on an upper side and a second space on a lower side;

wherein the separating member is provided with a penetrating hole to allow the first space and the second space to communicate with each other, an upper end portion of a pipe member is connected to a lower face of the separating member so as to communicate with the penetrating hole, and a lower end portion of the pipe member opens downwardly;

wherein a connecting end portion of the blow-by gas discharge pipe protrudes into the first space; and wherein a connecting end portion of the air-fuel mixture transport pipe communicates with the second space and is located higher than the lower end portion of the pipe member.

12. A personal watercraft comprising:

a body including a deck and a hull;

an engine room formed inside the body;

an engine body mounted in the engine room, with a crankshaft having a center axis of rotation extending along a longitudinal direction of the body;

an oil pan coupled to the engine body below the crankshaft;

an oil separator fluidically connected to the oil pan by an oil discharge pipe, the oil separator being positioned above and laterally to a side of a center of the oil pan; and an air-intake component fluidically connected to the oil separator by a blow-by gas pipe, the air-intake component being positioned above and laterally on an opposite side of the oil pan center from the oil separator, wherein an upper end of the air intake component is lower than an upper end of the oil separator.

* * * * *